G. GÜNTHER.
Bird-Cages.
No. 138,396. Patented April 29, 1873.
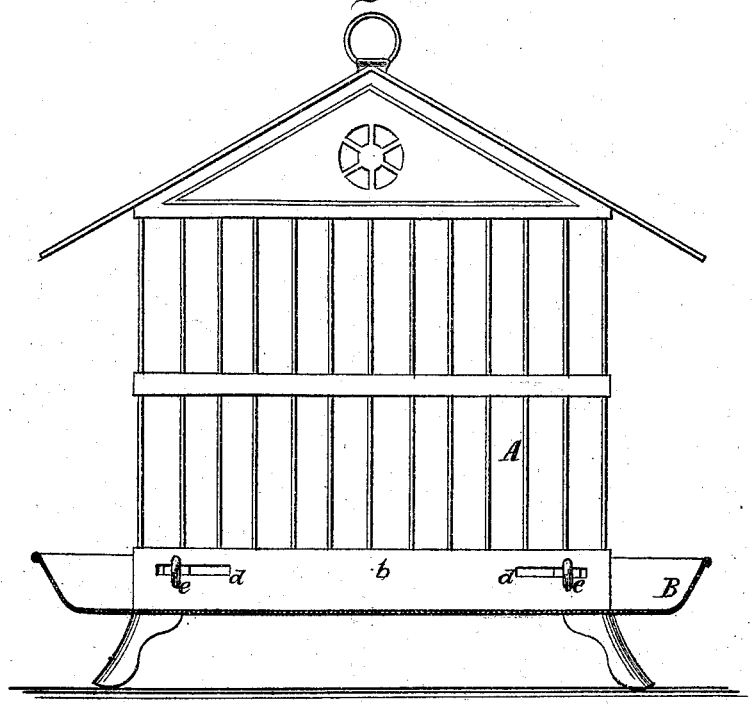
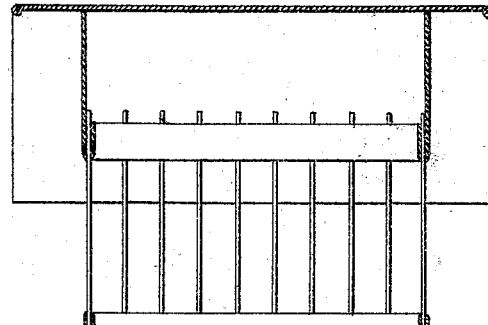
Witnesses.
Chas. Wahlers.
Ernst Bilhuber.
Inventor.
Gottlob Günther
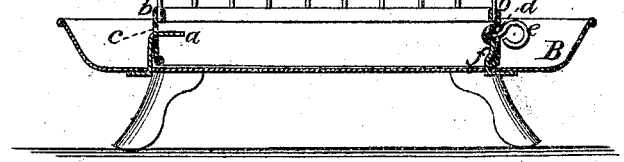

UNITED STATES PATENT OFFICE.

GOTTLOB GÜNTHER, OF NEW YORK, N. Y.

IMPROVEMENT IN BIRD-CAGES.

Specification forming part of Letters Patent No. 138,396, dated April 29, 1873; application filed March 14, 1873.

*To all whom it may concern:*

Be it known that I, GOTTLOB GÜNTHER, of the city, county, and State of New York, have invented a new and useful Improvement in Bird-Cages; and I do hereby declare the following to be a full, clear, and exact description thereof, which will enable those skilled in the art to make and use the same, reference being had to the accompanying drawing forming part of this specification, in which drawing—

Figure 1 represents a sectional front view of this invention. Fig. 2 is a transverse section of the same.

Similar letters indicate corresponding parts.

This invention consists in the combination of stationary hooks secured in or on the bottom of the cage with buttons which swivel in standards rising from said bottom, and which work in slots in the bottom band of the cage in such a manner that by turning said buttons in the proper position the cage can be withdrawn from the retaining-hooks and lifted off from its bottom, and by turning the buttons in another position, the cage, when adjusted on its bottom, can be firmly locked in position, and thereby a simple, cheap, and durable fastening is obtained.

In the drawing, the letter A designates a cage which rests on the bottom B. From one side of this bottom rises one or more hooks, *a*, which are fastened to the bottom either by rivets or by means of solder, and which may be made to extend through the bottom, as shown in Fig. 2, or which may be secured to the upper surface of the same. In the bottom band *b* of the cage are slots *c*, which can be made to engage with the hooks *a*, and on the opposite side of the bottom band are provided slots *d*, which can be made to engage with buttons *e*. These buttons swivel in standards *f*, which rise from the bottom of the cage and are secured thereto by solder or by rivets either on its upper or on its lower surface. Said buttons are of such a shape that the same, when turned in the proper position, will pass through said slots, but by turning said buttons to the position shown in the drawing they lock the cage down to its bottom.

When it is desired to remove the cage from its bottom the buttons *e* are turned to such a position that they will pass through the slots *d;* then the cage is moved outward until the buttons and the hooks *a* clear their respective slots in the bottom band, and after the cage is brought in this position it can be readily lifted off.

In order to replace the cage the same operation has to be followed in a reverse direction, and after the slots *c* and *d* have been made to catch over the hooks *a* and the buttons *e*, and when the buttons have been turned to the position shown in the drawing, the cage is firmly locked down to its bottom, and it cannot become accidentally disengaged.

The buttons are provided on their inner ends with large heads, which work against washers placed between them and their standards, so that said buttons are not liable to work loose.

It is obvious that this fastening can be applied to cages of all sizes and shapes which have a bottom band of sufficient width to give room for the slots *c* and *d*. If desired, however, the hooks *a* might be made to catch over the bottom band, and in this case that portion of the bottom band which is to engage with the locking button or buttons would have to be made wide enough to make room for a slot or slots to receive the button or buttons, or a separate plate would have to be secured to the cage for this purpose.

What I claim as new, and desire to secure by Letters Patent, is—

The combination of stationary hooks, (one or more,) secured in or on the bottom of a cage with one or more buttons which swivel in standards rising from said bottom, and which work in a slotted piece of metal attached to the bottom of the cage, substantially in the manner herein shown and described.

GOTTLOB GÜNTHER.

Witnesses:
W. HAUFF,
E. F. KASTENHUBER.